Sept. 9, 1969   J. B. GEISMAN ETAL   3,466,124
SINGLE FRAMING DEVICE FOR MOTION PICTURE PROJECTORS
Filed Feb. 6, 1967   2 Sheets-Sheet 1

INVENTOR
JEROME B. GEISMAN
REIN S. RANDMAE
BY
*Amster & Rothstein*
ATTORNEYS

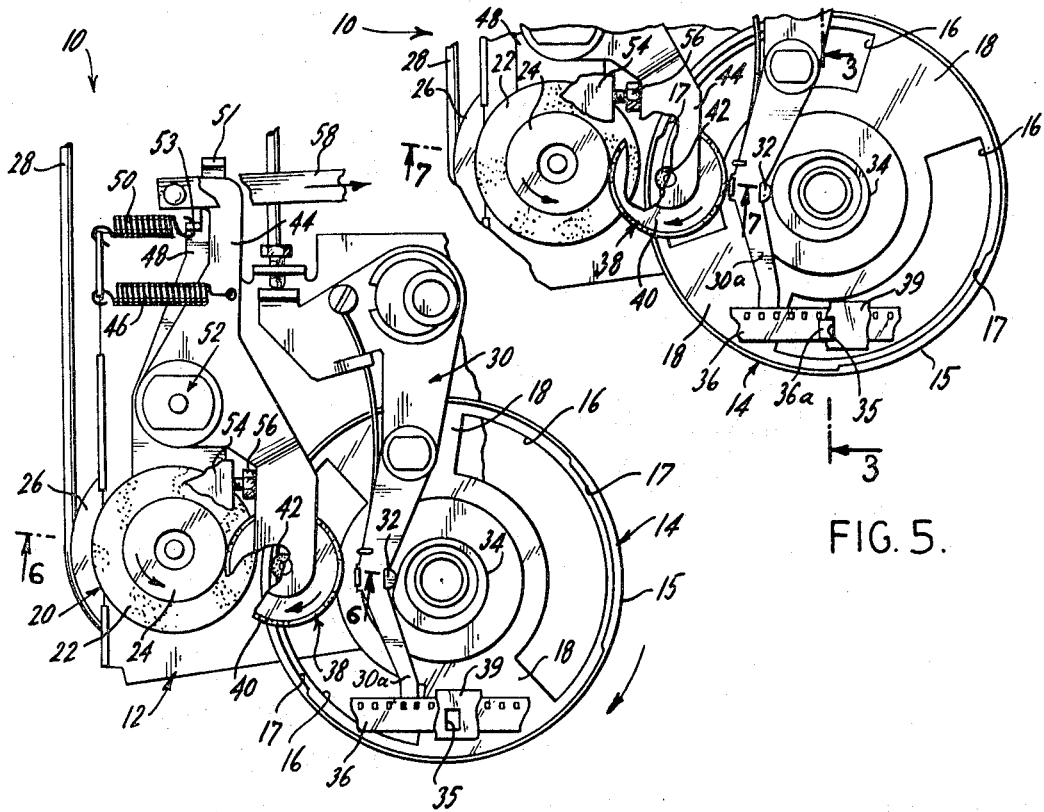
FIG. 4.
FIG. 5.
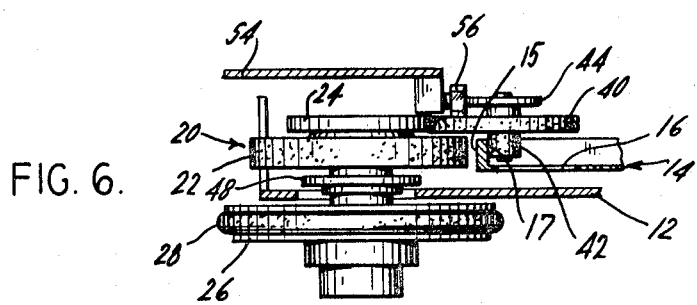
FIG. 6.
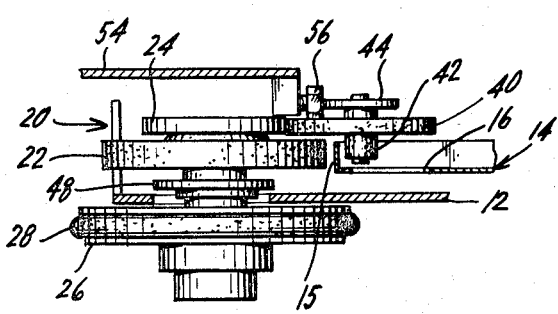
FIG. 7.
INVENTOR.
JEROME B. GEISMAN
REIN S. RANDMAE
BY
Anster & Rothstein
ATTORNEYS

United States Patent Office 3,466,124
Patented Sept. 9, 1969

3,466,124
SINGLE FRAMING DEVICE FOR MOTION
PICTURE PROJECTORS
Jerome B. Geisman, Roslyn Heights, and Rein S. Randmae, Babylon, N.Y., assignors, by mesne assignments, to Bohn Benton Inc., New York, N.Y., a corporation of New York
Filed Feb. 6, 1967, Ser. No. 614,150
Int. Cl. G03b 21/38, 1/00, 21/46
U.S. Cl. 352—169
16 Claims

ABSTRACT OF THE DISCLOSURE

A motion picture projector for providing unobstructed projection of single frames of motion picture film, has raised engaging segments disposed along the inner surface of the rim of a shutter wheel. The position and number of the segments are in spaced relation with the position and number of shutter blades which can block the projection optical path during single frame projection. When single frame projection is desired, the normal shutter drive is disengaged and the shutter is permitted to coast to a halt. If any portion of a shutter blade obscures the projection optical path, an auxiliary single frame mechanism, powered by the basic shutter drive, makes selective driving contact with the corresponding engaging segment until the obscuring blade is removed from the optical path.

---

This invention relates to motion picture equipment and more particularly to a single frame device for a motion picture projector.

With the increasing use of motion pictures, selective and extended viewing of a single frame during the normal projection of the film, is increasingly desirable and necessary in both front and rear screen motion picture projectors.

Single frame capability permits viewers to examine more closely details that otherwise escape recognition during the moving projection, and also to study written mateiral that can be contained in relatively few frames of a motion picture film. With single framing these few frames can be projected as long as desired, compared with the many frames necessary to provide the required viewing time on the moving film. In a teaching film, single frame capability can thus reduce the length of film, and therefore the cost, without diminishing or changing the content.

There has been an increased demand for motion picture projectors of various types in thhe educational field, which demand will further increase as programmed learning becomes an important pedagogical technique. Among the most valuable tools for programmed learning are motion pictures and the projectors to display them. With this and other new fields developing, single frame projection is an important requirement in the expanded use of motion pictures and motion picture projectors. As the art of programmed learning develops, a reliable single frame capability is not only desirable, but may very well be indispensable.

The single frame devices known to the art are by no means satisfactory. One widely used method to achieve single frame projection is to declutch the drive system and permit the shutter to "coast" to a stop. Stopping at random interposes two defects, (a) the single frame to be projected may not be centered in the aperture of the film gate, and (b) the shutter blades may obscure the optical path. In the first case parts of two adjacent frames are projected and in the second case, all or part of the projected image is lost. A manual control is usually provided by which the operator can properly center the desired frame in the aperture and also rotate the shutter blade out of the optical path of the image. Such manual adjustments are distracting and irritating and discourage the use of the single framing technique. In teaching films they interpose continuing mechanical adjustments that prevent complete concentration on the subject matter.

Another approach to automatic single frame control has been to use a hard stop that will stop the shutter blades in proper orientation with the optical path. This technique imposes mechanical shocks in bringing the high speed shutter to an abrupt halt. A projector routinely subjected to such shocks suffers excessive bearing and shaft wear and the continuing shock contributes to the loss of critical adjustments.

It is accordingly an object of the present invention to provide a reliable, low cost, single framing device which dispenses with both the need for manual adjustment of any kind and also avoids the hazards of bringing the shutter wheel to a jarring stop.

It is a further object of this invention to use the shutter wheel drive to provide the necessary auxiliary power, on a selective basis, to achieve properly indexed single framing in which the desired frame is properly centered in the film aperture and not obscured by a shutter wheel blade.

It is still another object of this invention to use the shutter wheel itself to determine automatically the need for auxiliary rotational motion to achieve centered and unobstructed single frame projection.

The present invention embodies an auxiliary single framing unit which comprises two coaxial rollers adapted to operate in conjunction with the shutter wheel and the shutter wheel drive. During normal projection the single framing unit remains disengaged.

When single framing action is desired, a solenoid brings the single frame unit into driving contact with the single frame drive hub of the main drive of the projector and simultaneously disengages the main drive puck of the conventional shutter drive from the outer rim of the shutter wheel. Such engagement of the single frame unit provides power to the single frame unit through the single frame drive hub of the rotating but disengaged drive puck which is in driving relation with the single frame coupling roller and its coaxial single frame roller.

The inner surface of the shutter wheel rim is provided, at selected locations, with engaging and non-engaging segments indexed to the shutter blades to cause the shutter blades to stop only at the desired location. The relative positions of the single frame drive roller and the engaging and non-engaging segments on the inner rim of the shutter wheel are such that the single frame drive roller merely rotates freely, making no driving contact, when the film is properly centered and the shutter blades do not obscure the single frame to be projected.

However, should the frame not be centered, or a shutter blade obscure the optical path and obstruct the single frame to be projected, the engaging segment on the inner rim of the shutter wheel, indexed to the obscuring blade, and thus to the film position in the aperture, is in automatic contact with the single frame drive roller. The rotating single frame drive roller then continues to turn the shutter wheel until the end of the engaging segment has been reached, at which time the obstructing shutter blade is out of the optical path and the frame to be projected is centered in the aperture.

It is therefore a feature of this invention that means are provided on the inner rim of a shutter wheel in a motion picture projector to stop the blade portions of the shutter wheel at any pre-determined position, and simultaneously to center the projected frame in the aperture of the film gate.

It is another feature of this invention that a single frame unit is adapted to be selectively driven by the shutter drive when it is required to position the shutter blades for single frame projection.

The above brief description, as well as further objects, features and advantages of the present invention, will be more fully appreciated by reference to the following detailed description of a presently preferred, but nonetheless illustrative embodiment demonstrating objects and features of the invention when taken in conjunction with the accompanying drawing, wherein:

FIG. 4 is a fragmentary and partially broken-away view of the single framing device of the present invention showing the shutter blade obscuring the film aperture, and the single frame drive roller in contact with an engaging segment of the shutter wheel;

FIG. 5 is a fragmentary and partially broken-away view showing the shutter wheel opening in proper alignment with the film aperture and the single frame drive roller freely rotating opposite a non-engaging segment of the inner surface of the rim of the shutter wheel;

FIG. 6 is a fragmentary sectional view taken along the line 6—6 of FIG. 4 in the direction of the arrows; and FIG. 7 is a fragmentary sectional view taken along the line 7—7 of FIG. 5 in the direction of the arrows.

Figure 1:
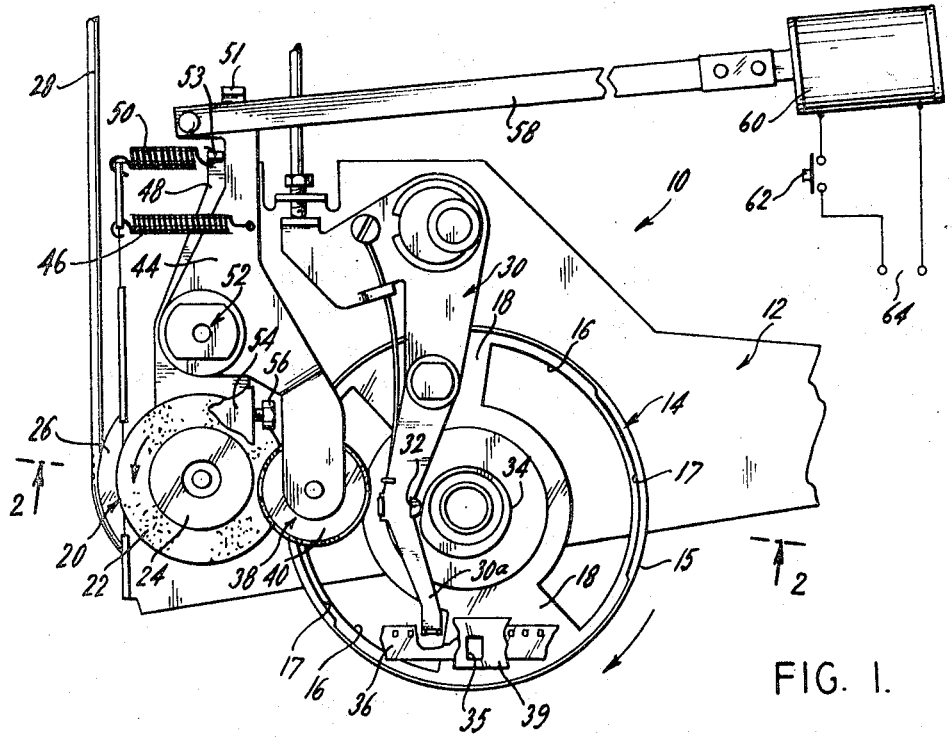
FIG. 1 is a fragmentary view of a conventional motion picture projector shutter and pull-down claw system showing the single framing unit of the present invention in an idle position while the projector is operating normally.

The normal shutter drive system of a rim-driven shutter wheel, in conjunction with the auxiliary single framing equipment of the present invention, is illustrated in FIG. 1.

Figure 3:
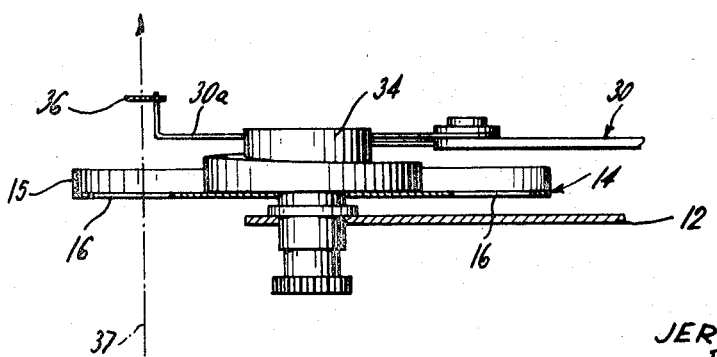
FIG. 3 is a fragmentary sectional view taken along the line 3—3 of FIG. 5 in the direction of the arrows showing a single frame of film aligned with a shutter wheel opening.

Specifically, this invention provides an indexed and non-jarring stopping arrangement to permit shutter wheel 14 to stop, as described below, so that its blades 18 never obscure the optical path (line 37 in FIG. 3) of the single frame 36a of the film 36 to be projected and so that the single projected frame is centered in aperture 35 of the film gate 39. As shown in FIG. 4, for example, if all or any part of a shutter blade 18 obstructs this optical path, the single frame to be projected is completely, or in part, obscured, and may also be decentered with respect to the film gate. Further adjustment, either manual as widely used, or automatic as disclosed in this invention, is then required.

The projection system generally referred to by the numeral 10 in FIG. 1 includes a mounting arrangement 12 on a frame 54 (only partially shown), shutter wheel 14, cam 34, framing arm 30 and pull-down claw 30a, seated within rider 32. The drive 20 for the shutter wheel 14 includes a main drive puck 22. Mounted coaxially with the puck 22 is the single frame drive hub 24. The drive for puck 22 is provided by means of a main drive pulley wheel 26, connected by belt 28 to a motor (not shown).

Figure 2:
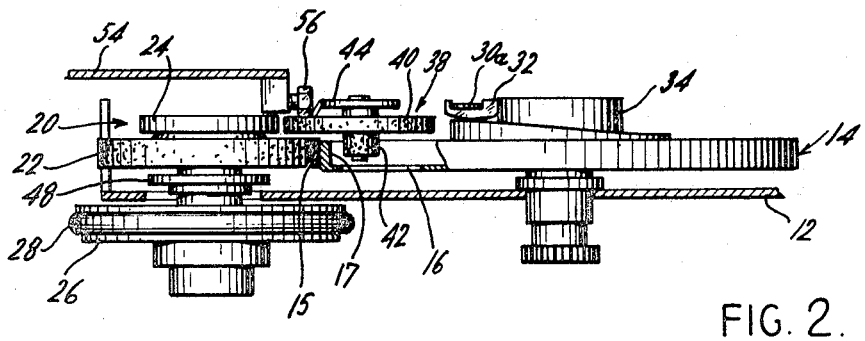
FIG. 2 is a sectional view of the normal projection arrangement, taken along the line 2—2 of FIG. 1 in the direction of the arrows.

Accordingly, during normal projection (e.g., FIGS. 1 and 2) of the film 36, the projector drive, by means of belt 28 and pulley wheel 26, drives the main drive puck 22 which is in driving relation with the outer surface of rim 15 of shutter wheel 14 (FIG. 2). This driving relationship is maintained by the spring-loaded drive puck arm or shutter drive carrier 48 in response to spring 50 and causes the normal rotation of shutter wheel 14.

To stop the moving presentation in order to project that single frame (e.g., frame 36a) of the film 36, at aperture 35, the single frame unit 38 mounted on arm 44 is activated by depressing pushbutton 62.

The single frame unit 38, as seen in its idle position in FIGS. 1 and 2, includes a supporting arm or single frame drive mounting 44, at one end of which the solenoid arm 58 is attached and at the opposite end of which single frame coupling roller 40 and the single frame roller 42 (FIG. 2) are coaxially mounted. The single frame drive mounting 44 is supported by, and pivots at, stud 52. Its excursion is limited by the adjustable limit stop 56, mounted on support or frame 54, in one direction, and by fixed limit stop 53, on shutter drive carrier 48, in the opposite direction.

The coupling roller 40 is aligned with drive or take-off hub 24, and the single frame roller 42 operates in conjunction with the engaging or driving segments 17 on the inner surface of the shutter rim 15, which are indexed with respect to the locations of roller 42, the shutter blades 18, cam 34, and the film aperture 35. (The lower surface between segments 17 are non-driving.)

It is apparent to those skilled in the art that this invention is applicable to shutter wheels with any number of blades when the engaging segments are indexed with respect to such blades.

During normal projection, the entire single frame device, 38, idles as shown in FIGS. 1 and 2. Held in its idle position by spring 46, it makes no operative contact with main drive 20, or with drive hub 24 or with the engaging segments 17, and does not interfere with the normal projection of the film 36.

When pushbutton 62 is depressed to stop the film motion for single frame projection, solenoid 60 is energized from the power source 64 (shown schematically) and, as shown in FIGS. 4 and 6, retracts arm 58, overcoming the tension of spring 46 and thereby pivoting single frame arm 44 about its pivot 52 until it reaches the limiting stop 56. Stop 56 is so adjusted that the roller 42 makes contact only with the raised engaging segments 17 of the shutter rim, and not with the non-engaging segments.

In the course of this travel the coupling roller 40 comes into operating contact with the single frame drive hub 24 mounted coaxially with drive puck 22. Overcoming the tension of spring 50, roller 40 removes drive puck 22 from its driving engagement with the outer surface of rim 15 of shutter wheel 14 (as shown in FIGS. 4–7), and shutter wheel 14 coasts to a stop. As a result the contact between coupling roller 40 and drive hub 24 imparts driving power through roller 40 to coaxial single frame roller 42, which now rotates.

As shown in FIGS. 4 and 6, if the shutter wheel 14 has stopped so that the frame 36a is not centered or a blade 18 obscures optical path 37, the indexed engaging segment 17 is in driving contact with single frame roller 42. The roller 42 then continues to rotate shutter wheel 14 until blade 18 is removed from the optical path 37 (FIG. 3), the frame 36a is centered, aperture 35 is unobstructed, and the single frame can be projected, at which time the end of engaging segment 17 has been reached by single frame roller 42, and the driving engagement with shutter wheel 14 is terminated, as shown in FIGS. 5 and 7.

If, when single framing is activated, the shutter wheel 14 stops with the opening 16 in path 37 (FIG. 3) as illustrated in FIGS. 5 and 7, the optical path 37 is not obscured, the frame 36a to be projected is centered in aperture 35, and action by the single frame roller 42 is not required. Roller 42 will therefore remain unengaged, idling freely within the stationary shutter wheel 14.

Accordingly, the present invention automatically removes a shutter blade where it obstructs the optical path in single frame projection and centers the frame to be projected in film gate aperture 35. However, it is so designed that when the proper alignment is established either by the random stop of the shutter wheel or after the proper adjustment by the single frame device, the single frame roller 42 is automatically disengaged and does not interfere with continued single frame projection. When normal motion picture projection is resumed by deactuating the solenoid 60 (FIG. 1), the entire single frame unit 38 returns to its stand-by position as shown in FIGS. 1 and 2.

A latitude of modification, change and substitution is indended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. In a motion picture projector including a shutter with at least one blade to block the optical path and at least one opening to allow light to travel along the optical path, the improvement comprising at least one engaging segment and at least one disengaging segment on said shutter, and means for selectively driving said shutter only when driving contact is made with said engaging segment.

2. A motion picture projector in accordance with claim 1 wherein said engaging and disengaging segments are arranged relative to said blade and said opening respectively such that said selective driving means is in driving contact with said engaging segment only if any portion of said blade obscures said optical path, and said selective driving means remains out of contact with said shutter rim at said disengaging segment thereof when said opening is aligned with said optical path.

3. A motion picture projector in accordance with claim 1 wherein said selective driving means includes a single frame coupling roller and a single frame drive roller, said single frame drive roller being coaxially mounted with said single frame coupling roller for making said selective contact with said engaging segment.

4. A motion picture projector in accordance with claim 3 including main shutter drive means having a drive roller for driving said shutter during normal projection and a take-off roller coaxially mounted with said drive roller and adapted to transmit power to said single frame coupling roller to enable single frame projection.

5. In a motion picture projector, a shutter having at least one blade to block the optical path, at least one opening to allow light to pass along the optical path and a rim with an inner driving surface and an outer driving surface, a shuter drive engaging one of said driving surfaces for rotating said shutter during motion picture projection, said shutter drive being mounted for movement between driving and non-driving positions, the improvement comprising a single frame mechanism for positioning said shuter for unobstructed single frame projection, said single frame mechanism being adapted to engage the other of said driving surfaces for rotating said shutter into proper single frame orientation, a single frame drive mounting operable to move said single frame mechanism into operating position and to move said shutter drive out of said driving position and means to transfer power to said single frame mechanism from said shutter drive out of said driving position and means to transfer power to said single frame mechanism from said shutter drive when said shutter drive is in said non-driving position.

6. A motion picture projector according to claim 5 wherein said other of said driving surfaces includes alternate and spaced driving and non-driving segments adapted to be selectively engaged by said single frame mechanism in said operating position to locate said opening in a prescribed orientation for single frame projection.

7. A motion picture projector according to claim 6 wherein said single frame mechanism includes a single frame drive having a coupling roller drivable by said power transfer means and a driving roller coaxial with said coupling roller and selectively engageable with said driving segment to achieve said prescribed orientation of said opening when any portion of said shutter blade obstructs said optical path in a single frame projection.

8. A motion picture projector according to claim 7 wherein said shutter drive includes a main drive roller contacting said one of said driving surfaces for motion picture projection, and wherein said power transfer means includes a hub mounted coaxially with said main drive roller for transmitting power to said coupling roller of said single frame drive when said shutter drive is in said non-driving position and said single frame mechanism is in said operating position.

9. A moton picture projector according to claim 5 including a carrier positioning said shutter drive in said driving and non-driving position, a limit stop on said carrier, a first spring connected to said carrier for urging said shutter drive into said driving position and a second sping connected to said single frame drive mounting for urging said single frame mechanism out of said operating position whereby said single frame drive mounting abuts said limit stop to limit the movement thereof in one direction.

10. A motion picture projector according to claim 9 including a further limit stop, a common mounting for said carrier and said single frame drive mounting and means operatively connected to said carrier and said single frame drive mounting for enabling said single frame projection by moving said single frame drive mounting about said common mounting into said operating position and moving said carrier about said common mounting into said non-driving position, the movement of said single frame drive mounting being limited by said further limit stop to limit the movement thereof in the opposite dirction.

11. In a motion picture projector having an optical path, a rotary shutter along said optical path including at least one blade adapted to block the travel of light along said optical path and at least one opening adapted in a prescribed shutter position to allow light to travel along said optical path and a projection shutter drive engaging said shutter for rotating said shutter during motion picture projection, the improvement comprising a single frame mechanism for positioning said shutter in said prescribed shutter position for unobstructed single frame projection, said mechanism including a single frame drive, means under operator control for engaging said single frame drive to said shutter to rotate the same into said prescribed shutter position and means responsive to engagement of said single frame drive with said shutter for disengaging said projection shutter drive.

12. In a motion picture projector according to claim 11, wherein said shutter including inner and outer driving surfaces and said projection shutter drive is in engagement with one of said driving surfaces and said single frame drive is in engagement with the other of said driving surfaces.

13. In a motion picture projector according to claim 12, said other driving surface including at least one arcuate drive-engaging segment and at least one arcuate drive-disengaging segment and wherein said single frame drives said shutter only when driving contact is made with said drive-engaging segment.

14. In a motion picture projector according to claim 13, said projection shutter drive engaging said outer driving surface and said single frame drive engaging said inner driving surface.

15. In a motion picture projector according to claim 11, a common drive for both said projection shutter drive and said single frame drive, said common drive including respective drive elements selectively engageable with said shutter, the means responsive to engagement of said single frame drive being operable to engage the driven element of said single frame drive with said shutter and to disengage the driven element of said projection shutter drive from said shutter.

16. In a motion picture projector according to claim 15, said shutter having a continuous driving surface and a segmented driving surface, the driven element of said projection shutter drive engaging said continuous driving surface and the driven element of said single frame drive engaging said segmented driving surface.

References Cited
UNITED STATES PATENTS

| 2,468,993 | 5/1949 | Moomaw | 352—160 |
| 3,397,937 | 8/1968 | Schrader | 352—169 |

NORTON ANSHER, Primary Examiner

MONROE H. HAYES, Assistant Examiner

U.S. Cl. X.R.
352—177, 164